United States Patent [19]
Mohr et al.

[11] Patent Number: 5,489,781
[45] Date of Patent: Feb. 6, 1996

[54] DUAL MODALITY DETECTOR

[75] Inventors: Gregory A. Mohr, Scotia; Robert S. Gilmore, Burnt Hills, both of N.Y.; Gerald B. Nightingale, Westchester; Thomas W. Birdwell, Middleton, both of Ohio

[73] Assignee: General Electric Company, Schenectady, N.Y.

[21] Appl. No.: 317,051

[22] Filed: Oct. 3, 1994

[51] Int. Cl.[6] .............................. G01T 1/185; G01T 3/00
[52] U.S. Cl. .................. 250/385.1; 250/374; 250/390.1; 250/390.02
[58] Field of Search ................................ 250/374, 385.1, 250/390.01, 390.02, 390.12; 378/63

[56]  References Cited

U.S. PATENT DOCUMENTS 3,707,632  12/1972  Cooper et al. ................. 250/385.1
4,570,071  2/1986  Sippel et al. ..................... 250/374

Primary Examiner—Carolyn E. Fields
Attorney, Agent, or Firm—David C. Goldman; Paul R. Webb, II

[57] ABSTRACT

A dual modality gas ionization detector for differentiating neutron attenuating material from high x-ray attenuating material in an object. The dual modality gas ionization detector uses $^3$He and Xe gases pressurized in an ionization chamber to detect neutrons x-rays or gamma rays. The dual modality gas ionization detector is used in an inspection system for detecting, characterizing, or differentiating small amounts of neutron attenuating materials in objects composed primarily of materials of large attenuating x-ray material.

3 Claims, 1 Drawing Sheet

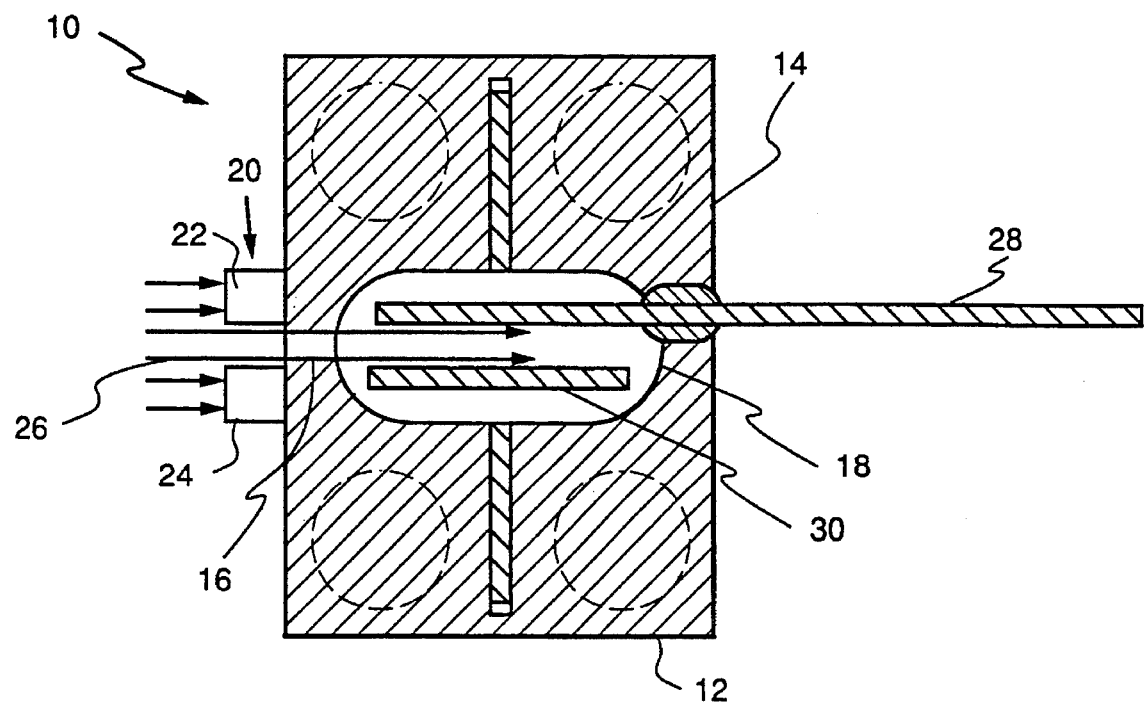

DUAL MODALITY DETECTOR

CROSS REFERENCE TO RELATED APPLICATIONS

This application is related to copending application entitled "A System and Method For Using A Dual Modality Detector For Inspecting Objects," U.S. Ser. No. 08/317,049 filed concurrently herewith and assigned to the same assignee as the present invention.

BACKGROUND OF THE INVENTION

The present invention relates generally to radiography, and more particularly to using radiographic inspection for examining objects.

Radiographic inspection generally involves discriminating an amount of penetrating radiation (i.e., x-ray or gamma ray) that is transmitted along different paths through an object. Current radiographic inspection methods are capable of only detecting the total amount of radiation being transmitted along a path through the object and not the amount of radiation being transmitted at each of the individual locations that comprise the path. For example, in a conventional x-ray radiographic system, a sheet of film is used to detect the x-rays being transmitted through an object along the paths that arise between each region of the sheet of film and a x-ray source. In regions corresponding to paths that contain relatively large amounts of highly attenuating material, the film intercepts few transmitted x-rays, whereas for paths containing small amounts of less attenuating materials, the film is heavily exposed. Since the sheet of film is sensitive to the total of summed contributions to the beam attenuation along each path, it is very difficult to discriminate between paths containing a small amount of highly attenuating material and paths with a correspondingly greater amount of less attenuating material.

The lack of discrimination in conventional radiographic methods makes detection of certain types of flaws extremely difficult. In particular, it is very difficult to detect defects in objects that are characterized by having small amounts of slightly attenuating materials combined with an overall background of highly attenuating material. Examples of such inspection problems are present in x-ray radiographic detection of nitrogen contamination of titanium, which is believed to be the underlying cause for hard α defects, and the detection of unremoved ceramic core material in cast nickel-alloy turbine blades, which is believed to be responsible for certain types of blade failure during operation. However, the contaminants in both these examples attenuate neutrons at significantly different levels then the base materials. If the titanium nuggets and turbine blades contain small amounts of neutron attenuating material, it is very important to be able detect nuggets and blades which have the neutron attenuating material. In either case, conventional x-ray radiographic detection is unable to discriminate the neutron attenuating material from the large x-ray attenuation material.

One possible solution to the above problems is to use computed tomography (CT), which measures the local attenuation coefficient in an image plane. However, CT requires a large number of radiographic exposures for each image plane and extensive computation for reconstructing the image. Other disadvantages in using CT for inspections are that it is expensive and time-consuming, especially if many image slices are required to adequately sample the object volume.

Another technique used to overcome the problems associated with conventional radiographic methods is to use dual-energy x-ray methods to discriminate between material properties. Dual energy x-ray methods attempt to measure the amount of energy that is absorbed and scattered. Determining the separate contributions between absorption and scattering requires a significant amount of processing, and is generally very difficult to do effectively with conventional x-ray sources. In order to overcome this problem, some dual energy methods have replaced the variable energy x-ray source with gamma ray sources. However, gamma ray sources are usually weaker than x-ray sources, resulting in greater signal to noise effects. A problem common to both the x-ray source and the gamma ray source dual-energy method is that they are not sensitive to neutrons.

Another technique that has been used is to replace the radiographic film with gas ionization detectors filled with $BF_3$, $^3He$ or Xe. An example of a gas ionization detector filled with Xe is disclosed in U.S. Pat. No. 4,570,071. The problem with these types of gas ionization detectors are that they are sensitive either to only x-rays or gamma rays or only to neutrons and not sensitive to both x-rays or gamma rays and neutrons.

SUMMARY OF THE INVENTION

The present invention has developed a dual modality gas ionization detector that is sensitive to neutrons and x-rays or gamma rays by filling the detector with both $^3He$ and Xe gases. The dual modality gas ionized detector filled with both $^3He$ and Xe gases is preferably used in applications requiring the sensitive detection, characterization, and differentiation of small amounts of neutron attenuating materials in objects composed primarily of materials with large x-ray attenuation material. The dual modality gas ionized detector filled with both $^3He$ and Xe gases is preferably used for detecting hard α defects (i.e., nitrogen contaminations) present in titanium sponge nuggets and residual core material present in hollow-cast turbine blades.

Therefore, it is a primary objective of the present invention to provide a dual modality gas ionization detector sensitive to both neutrons and x-rays or gamma rays for detecting, characterizing, and differentiating small amounts of neutron attenuating materials in objects composed primarily of materials with large x-ray attenuation.

Thus, in accordance with one embodiment of the present invention, there is provided a radiation detector sensitive to alternately pulsed sources of neutrons and x-rays or gamma rays. The dual modality detector comprises a housing having a window for transmitting incident neutrons and x-rays or gamma rays at one end and an end plate at an opposite end. A chamber is located in the housing between the window and the end plate. A collimation means is located near the window for collimating the alternately pulsed beams of neutrons and x-rays or gamma rays into the chamber. An array of electrodes extends through the housing end plate into the chamber. The array of electrodes is substantially parallel to the collimated radiation. An electrically conductive plate is placed within the chamber and substantially parallel to the array of electrodes. A gaseous dielectric is positioned between the array of electrodes and the electrically conductive plate. The gaseous dielectric comprises a mixture of Xe gas and $^3He$ gas. The radiation enters the chamber through the collimator and the window and interacts with the $^3He$ and Xe gases to produce secondary ionization charges. The electrodes are maintained at a potential difference by the electrically conductive plate. The existing electric field separates the negative electrons from the positively charged ions and accelerates the charged particles toward an electrode. The charges are then detected by the array of electrodes.

While the present invention will hereinafter be described in connection with a preferred embodiment and a system and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWING

FIG. 1 shows a cross-sectional view of the dual modality gas ionization detector used in the present invention.

DETAILED DESCRIPTION OF THE PRESENT INVENTION

FIG. 1 is a cross-sectional view of a dual modality gas ionization detector 10 used in the present invention. The detector includes a generally-rectangular housing 12 made of a metal or metal alloy having an end plate 14 at one end and a window 16 for transmitting incident neutrons and x-rays or gamma rays at an opposite end. The window is constructed of a material which is permeable to neutrons and x-rays or gamma rays such as aluminum. The window is preferably a plano-concave aluminum lens that permits neutrons and x-rays or gamma rays to enter the housing. Inside the housing is an ionization chamber 18 filled with high pressure gases such as $^3$He and Xe. The $^3$He and Xe gases are used in the ionization chamber to detect the neutron and x-ray or gamma ray fluxes incident on the ionization detector. In the preferred embodiment, the mixture of Xe gas and $^3$He gas is formed from a partial pressure of $^3$He having a range of about 0.5 to about 2 atmospheres and a partial pressure of Xe having a range of about 50 to about 75 atmospheres. In another embodiment, $BF_3$ can be used in place of $^3$He. A collimator 20 which comprises two bars 22 and 24 made from tungsten, gadolinium, or the like, define a slit 26 between the parallel bars. The neutrons and x-rays or gamma rays entering the chamber are collimated to be substantially parallel and travel as a thin beam into the chamber. An array of electrodes 28 extending through the housing end plate into the chamber are positioned parallel to the entering thin sheet of radiation. Also, in the chamber is an electrically conductive plate 30, which is substantially parallel to the array of electrodes.

In operation, radiation enters the chamber through the collimator and the window and interacts with the $^3$He and Xe gases to produce secondary ionization charges. Since the electrodes are maintained at a potential difference relative to the electrically conductive plate 30, there exists an electric field which separates negative electrons from positively charged ions, and accelerates the charged particles toward an electrode. The charges are then detected by the array of electrodes 28. Further discussion of the gas ionization detector and its operation are provided in U.S. Pat. No. 4,570,071, which is incorporated herein by reference.

The ratiometric detection used by the dual modality gas ionization detector is based on the theory that the attenuation of ideal beams of either neutrons or photons from x-rays or gamma rays passing through an object made from homogeneous material is described by the following relation:

$$I=I_0 e^{-\alpha L}, \quad (1)$$

wherein I is the intensity of the beam after passing through the object, $I_0$ is the incident beam intensity, $\alpha$ is the linear attenuation coefficient of the object material for the type of radiation, and L is the path length of the beam through the object. The transmitted fraction of the beam, T, is the ratio of I over $I_0$. Thus, the transmitted fraction of the beam is measured by recording the detector output signal in the absence of the object, which is proportional to $I_0$, with the part in the beam, which is proportional to I. Then one result is divided by the other result to obtain T.

By translating the object relative to the dual modality detector in the direction perpendicular to both the beam and the detector array, a two-dimensional mapping of transmission is obtained by using a processing means and a display. The resulting digital radiograph resembles a conventional film radiograph. For inspections of normally homogeneous material objects, the T data is logarithmically transformed as $$-\ln T = -\ln \frac{I}{I_0} = -\ln(e^{-\alpha L}) = \alpha L, \quad (2)$$

which obtains a mapping or image with pixel values that are proportional to the amount of material penetrated along each path between source and detector elements.

One of the central features of the present invention involves forming an image or mapping of the ratio of both logarithmically transformed measures in the form $$R = \frac{-\ln T_x}{-\ln T_n} = \frac{\alpha_x L}{\alpha_n L} = \frac{\alpha_x}{\alpha_n}, \quad (3)$$

wherein subscripts n and x refer to neutron and x-ray measurements respectively. The measurement of R provides a constant value characteristic of the material in the beam path that does not depend on the amount of material present in the beam path. However, if a small defect composed of a different material is present in the object under inspection, an image R demonstrates a variation from the constant background level that depend on the amount and type of defect material present.

Since R is independent of the amount of material, this method permits inspection of foreign object defects and inclusions even in irregularly shaped objects such as titanium sponge nuggets, turbine blades or the like, as disclosed in the concurrently filed and commonly assigned application entitled "A System and Method For Using A Dual Modality Detector For Inspecting Objects," U.S. Ser. No. 08/317,049. Nuggets with spatially localized nitrogen or oxygen bearing inclusions will produce R-images with distinct regions of variations different from the characteristic value for titanium. Nuggets that have an overall contamination will yield images having a marked thickness variation due to the presence of multiple materials.

The ratiometric method can also be extended to more sophisticated transformations than the logarithmic approached outlined above. The attenuation of polychromatic x-ray beams, for instance, does not follow a strict exponential dependence. However, more correct relations between measured transmittances and $\alpha_n$, $\alpha_x$, and L can be used for identifying anomalous values of R as a function of $I_n$ and $I_x$, similarly characterizing the presence of foreign materials.

It is therefore apparent that there has been provided in accordance with the present invention, a dual modality gas ionization detector for detecting low attenuating material from high attenuating material in an object that fully satisfy the aims, advantages and objectives hereinbefore set forth. The invention has been described with reference to several embodiments, however, it will be appreciated that variations and modifications can be effected by a person of ordinary skill in the art without departing from the scope of the invention.

We claim:

1. A dual modality radiation detector sensitive to alternately pulsed sources of neutrons and x-rays or gamma rays, the dual modality detector comprising:

a housing having a window at one end and an end plate at an opposite end;

a chamber located in the housing between the window and the end plate;

collimation means located near the window for collimating the alternately pulsed neutrons and x-rays or gamma rays into the chamber;

an array of electrodes extending through the housing end plate into the chamber, the array of electrodes being substantially parallel to the collimated neutrons and x-rays or gamma rays;

an electrically conductive plate within the chamber and substantially parallel to the array of electrodes; and a gaseous dielectric positioned between the array of electrodes and the electrically conductive plate, the gaseous dielectric comprising a mixture of Xe gas and $^3$He gas and being ionized by the collimated neutrons and x-rays or gamma rays and the electrically conductive plate.

2. The detector according to claim 1, wherein the mixture of Xe gas and $^3$He gas includes using a partial pressure of $^3$He having a range of about 0.5 to about 2 atmospheres and a partial pressure of Xe having a range of about 50 to about 75 atmospheres.

3. The detector according to claim 1, wherein the collimator means is formed from a Gd compound which is used for neutrons.

* * * * *